United States Patent

Wehle et al.

[11] Patent Number: 5,320,240
[45] Date of Patent: Jun. 14, 1994

[54] CLOSURE FOR A VESSEL

[75] Inventors: Anton Wehle, Fellbach; Günter Wolf, Oppenweiler; Werner Vonderau, Althütte, all of Fed. Rep. of Germany

[73] Assignee: Andreas Stihl, Waiblingen, Fed. Rep. of Germany

[21] Appl. No.: 11,514

[22] Filed: Feb. 1, 1993

[30] Foreign Application Priority Data

Feb. 1, 1992 [DE] Fed. Rep. of Germany ... 9201246[U]

[51] Int. Cl.$^5$ .......................... B65D 55/16; B65D 3/00
[52] U.S. Cl. ..................................... 220/375; 220/367
[58] Field of Search .............. 220/375, 367, 360, 361, 220/205, 206

[56] References Cited

U.S. PATENT DOCUMENTS

| 2,647,655 | 8/1953 | Robinson | 220/375 |
| 3,490,177 | 1/1970 | Perrion | 220/375 |
| 4,106,664 | 8/1978 | Renk et al. | 220/375 |
| 4,113,138 | 9/1978 | Fields et al. | 220/375 |
| 4,705,190 | 11/1987 | Mizusawa | 220/375 |

Primary Examiner—Joseph Man-Fu Moy
Attorney, Agent, or Firm—Walter Ottesen

[57] ABSTRACT

The invention is directed to a closure for a vessel such as a fuel tank or lubricant tank of a portable handheld work apparatus having an internal combustion engine. The closure includes a filling stub formed on the vessel and defining an opening and a cap for closing off the opening seal tight with respect to the ambient when the cap is placed on the filling stub. A holder prevents the cap from being separated from the vessel after the cap has been removed from the filling stub. The holder includes a flexible member having first and second end portions and an elongated flexible segment disposed between the end portions. A first attachment disposed on an inner wall surface of the cap fixedly holds the first end portion on the cap and a second attachment disposed on the vessel fixedly holds the second end portion on the vessel.

13 Claims, 2 Drawing Sheets

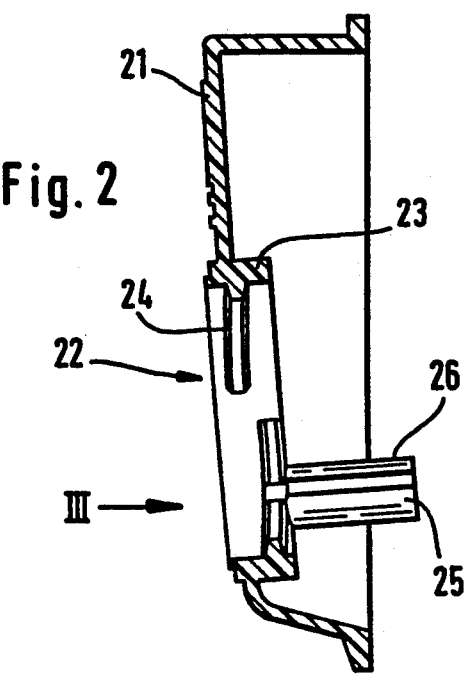
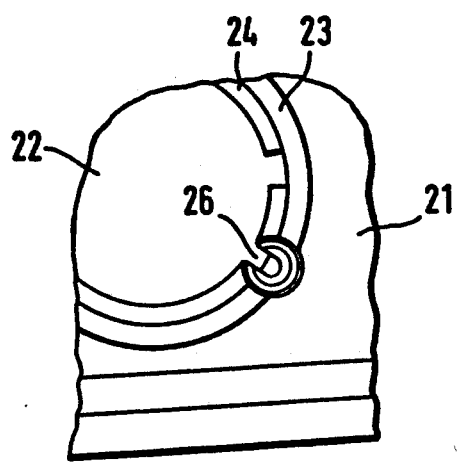
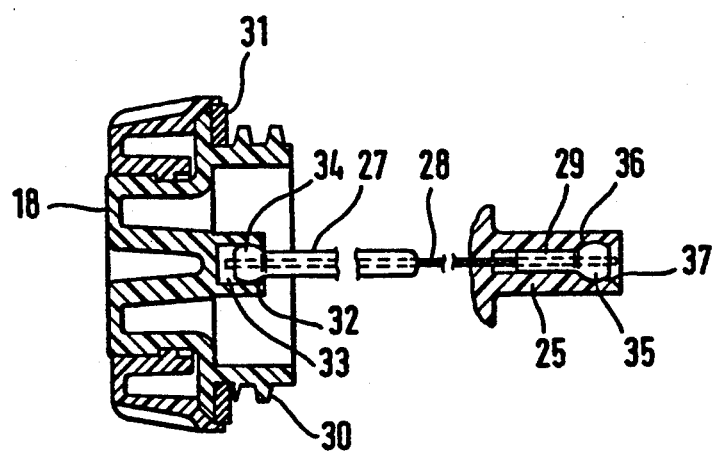
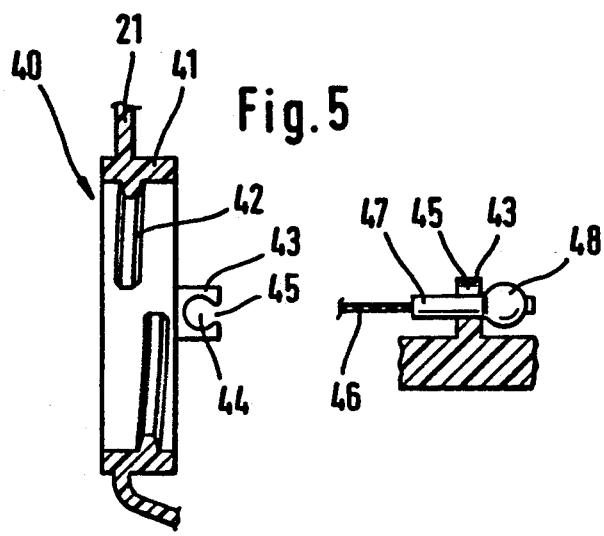
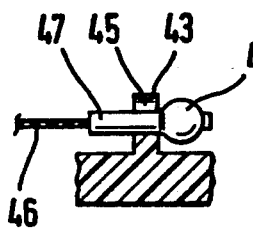

5,320,240

CLOSURE FOR A VESSEL

FIELD OF THE INVENTION

The invention relates to a closure for a vessel for holding liquids such as a fuel tank or lubricant tank for a handheld portable work apparatus equipped with an internal combustion engine.

BACKGROUND OF THE INVENTION

U.S. Pat. No. 4,705,190 discloses a closure for a tank wherein a cap is held on a holding unit made of plastic so that the cap cannot be lost when threadably disengaged from the tank. The holding unit comprises a ring-like portion at a first end which surrounds the cap. For this reason, the ring-like portion must be made correspondingly large and the second end of the holding unit is insertably held in a tube. A retainer in the form of a projection is provided at the second end of the holding unit and prevents the holding unit from slipping out of the tube. This holding unit for a tank closure is configured for motor vehicles and is complex to manufacture. In addition, the holding unit requires additional construction space for accommodating the insertable portion of the holding unit. A loop is formed laterally of the tank closure and would be most inconvenient in portable handheld tools when working, for example, in brush or the like.

SUMMARY OF THE INVENTION

In view of the foregoing, it is an object of the invention to provide a closure for a tank wherein the cap is held so that it cannot be lost during filling of the tank. It is a further object of the invention to provide a closure for a tank wherein the holding unit can be manufactured in a simple manner and especially at low cost.

The closure of the invention is for a vessel such as a fuel tank or lubricant tank of a portable handheld work apparatus having an internal combustion engine. The closure includes: a filling stub formed on the vessel and defining an opening; a cap for closing off the opening seal tight with respect to the ambient when the cap is placed on the filling stub; the cap and the filling stub conjointly defining engaging means for receiving and securing the cap to the filling stub when the cap is mounted thereon; the cap having a wall surface which faces into the opening when the cap is mounted on the filling stub; holding means for preventing the cap from being separated from the vessel after the cap has been removed from the filling stub; the holding means including a flexible member having first and second end portions and an elongated flexible segment disposed between the end portions; first attachment means being disposed on the wall surface for fixedly holding the first end portion on the cap; and, second attachment means for fixedly holding the second end portion on the vessel.

The flexible member lies on the inner side of the vessel and is, for example, fixed on the inner edge of the filling stub. For this reason, the flexible member will lie above the edge of the filling stub when the cap is removed so that the entire cross section of the filling stub is open. Accordingly, no disturbing portions project into the region of the filling opening so that tanking can take place through a filling tube defining a filling nozzle. The tube can be inserted deep into the filling stub. The outer diameter of the filling tube to be introduced can correspond approximately to the inner diameter of the filling stub.

An advantageous embodiment of the closure of the invention comprises providing the flexible member as a braided cord having respective ends with plastic molded thereon. A cord of this kind is greatly resistant to tearing while having a minimal material thickness and does not hinder in any way tanking of fuel because of its minimal material thickness. The injection-molded ends of plastic facilitate holding the flexible ends in the receptacles provided on the closure and filling stub, respectively. As an alternate embodiment, the flexible member can be a plastic band with the ends being configured so as to be stable with respect to form.

According to another feature of the invention, the ends preferably include a shank and a segment having an expanded diameter. These segments are held in a form-tight manner on the cap and on the filling stub, respectively, rearward of an opening having a reduced cross section. It is especially advantageous that the segment having the expanded diameter has at least in part a spherical surface. This configuration has the advantage that the end of the flexible member is journalled in the holder so as to be limitedly movable in all directions and has the further advantage that pushing the flexible member into a snap connection is facilitated.

A slit tube can be mounted on the filling stub for holding the flexible member thereto. The slit tube has a collar formed thereon directed inwardly. The tube has a slit so that the flexible member can be passed through the slit. The inwardly-directed collar defines the form-tight holder for the segment having the expanded diameter of the end of the flexible member.

As an embodiment alternative to the slit tube, a bore can be provided in a projection on the cap or on the filling stub. Furthermore, it is advantageous that both ends of the flexible member have the same form and that the attachment means at the filling stub and the cap have approximately the same configuration. This provides a universal application and facilitates assembly of the arrangement.

BRIEF DESCRIPTION OF THE DRAWINGS

The invention will now be described with reference to the drawings wherein:

FIG. 2 is a detail view taken through a portion of the top wall of a fuel tank;

FIG. 3 is a detail view of a portion of the top wall shown in FIG. 2 viewed in the direction of arrow III;

FIG. 4 is a section through a cap and a holding element on the filling stub with the ends of the flexible member mounted therein;

FIG. 5 is an alternate embodiment of the attachment element on the filling stub; and, FIG. 6 shows the attachment of an elastic member on a projection of the filling stub shown in FIG. 5.

DESCRIPTION OF THE PREFERRED EMBODIMENTS OF THE INVENTION

Figure 1:
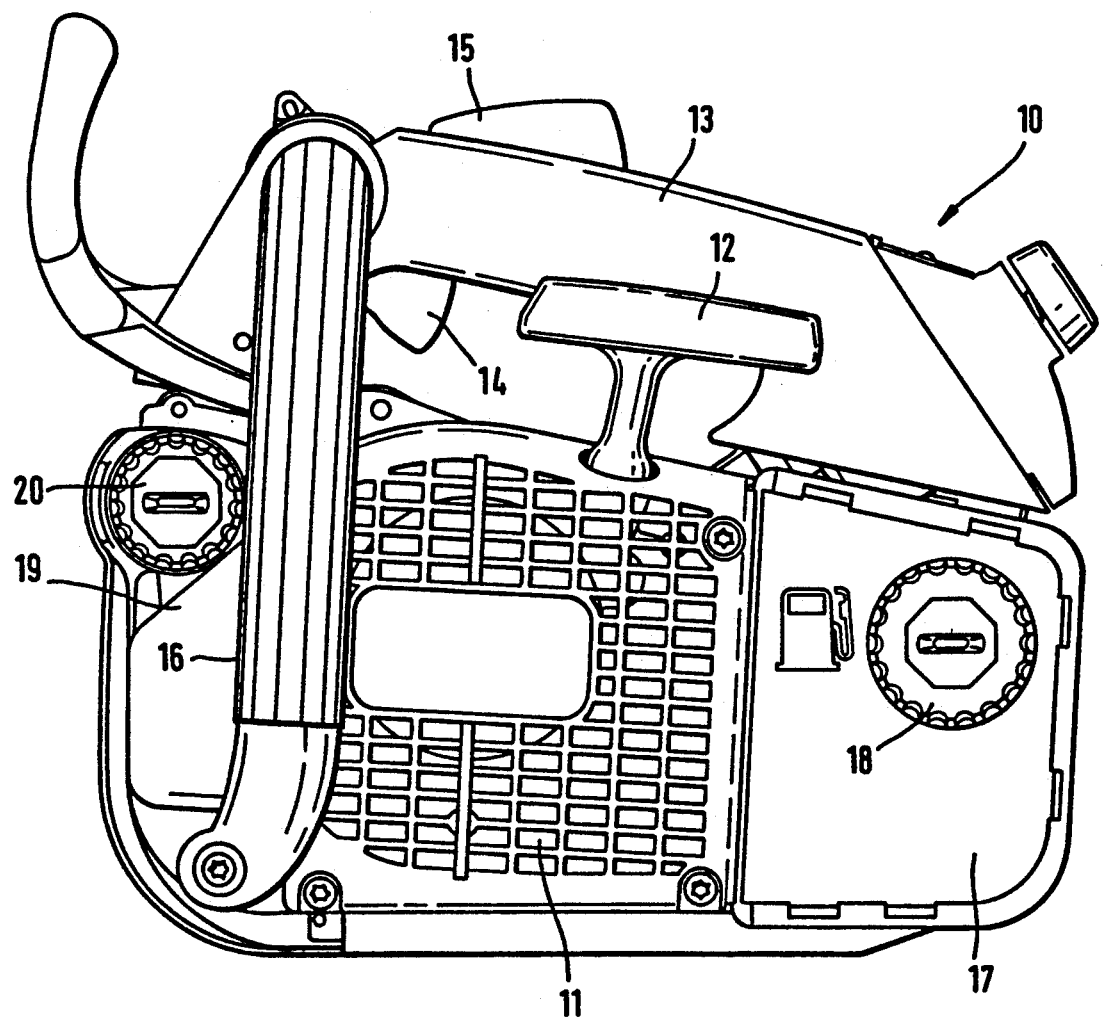
FIG. 1 is a side elevation view of a portion of a work apparatus equipped with an internal combustion engine and a fuel tank.

FIG. 1 shows a portion of a handheld portable work apparatus 10 with this portion including an internal combustion engine 11 having a starter device 12, a handle 13 with levers 14 and 15 mounted therein and a handle 16 for holding and guiding the work apparatus 10 with the aid of the second hand. The internal combustion engine 11 is mounted adjacent to a fuel tank 17 which is provided with a cap 18. Furthermore, a vessel 19 is provided for a lubricant such as for oil for lubricating a saw chain. The cap 20 of the vessel 19 differs from that of the fuel tank 17 only with respect to size.

FIG. 2 is a section view taken through a top wall 21 of the fuel tank and includes a filling stub 22. This filling stub 22 is configured essentially in the form of a sleeve 23 and is provided with an internal thread 24. A plastic tube 25 is formed on the sleeve 23 and projects into the tank. The plastic tube 25 has a longitudinal slit 26 so that the tube opens toward the center axis of the sleeve 23.

FIG. 3 shows a detail portion of the top wall 21 and the filling stub 22. The tube 25 has a longitudinal slit 26 and is arranged in the region of the thread 24. The position of the longitudinal slit 26 is toward the axis of the sleeve 23 and facilitates insertion of the end of the flexible member.

FIG. 4 shows a section through the cap 18 with the end 27 of a braided cord 28 shown attached thereto. FIG. 4 also shows a section through the tube 25 in which the other end of the cord 28 is attached. The cap 18 is provided with a seal 31 and a thread 30 which corresponds to the internal thread 24 of the filling stub 22. A receptacle 33 is provided with latching means 32 and is arranged on the cap 18 on the side thereof directed toward the inside of the fuel tank 17. The receptacle 33 is provided for a segment 34 of the end 27 of the elastic member with the segment 34 being widened in diameter. This receptacle 33 is likewise made of plastic and is formed on the cap 18. The other end 29 of the braided cord 28 lies in the tube 25. For assembling this arrangement, the cord 28 is inserted through the slit 26 and then pulled in the direction toward the cap 18 whereby the end 29 moves into the tube 25 and an expanded segment 35 of the end 29 lies against a shoulder 36 in the tube 25. A projection 37 is provided in the tube 25 to ensure that the end 29 of the cord 28 can no longer slip back. The projection 37 and the expanded segment 35 conjointly define a snap connection.

FIG. 5 shows a section taken through a filling stub 40 which corresponds to the filling stub 22 shown in FIG. 2 and likewise has the form of a short sleeve 41 having an internal thread 42. A projection 43 is formed on the edge of the sleeve 41 facing toward the inner side of the top wall portion 21. The projection 43 has a bore 44 which communicates via a slit 45 with the outer edge of the projection 43.

In FIG. 6, the attachment of an elastic element 46 to the projection 43 is shown. One end 47 of the elastic element 46 is made of plastic stable with respect to form. The diameter of the end 47 is so dimensioned that an adequate clamping force is provided to prevent the end from slipping out. The end 47 is provided with a segment 48 having a widened diameter in order to take up pulling forces that occur when the cap is opened. For assembly, the elastic member 46 is passed through the slit 45 into the bore 44 and the end 47 is then axially pressed into the bore 44.

It is understood that the foregoing description is that of the preferred embodiments of the invention and that various changes and modifications may be made thereto without departing from the spirit and scope of the invention as defined in the appended claims.

What is claimed is:

1. A closure for a vessel such as a fuel tank or lubricant tank of a portable handheld work apparatus having an internal combustion engine, the tank defining an interior and the closure comprising:

a filling stub formed on said vessel and defining an opening;

said filling stub defining a central axis and having an inner end portion facing into said interior of said tank;

a cap for closing off said opening seal tight with respect to the ambient when said cap is placed on said filling stub;

said cap and said filling stub conjointly defining engaging means for receiving and securing said cap to said filling stub when said cap is mounted thereon;

said cap having a wall surface which faces into said opening when said cap is mounted on said filling stub;

holding means for preventing said cap from being separated from the vessel after the cap has been removed from said filling stub;

said holding means including a flexible member having first and second end portions and an elongated flexible segment disposed between and interconnecting said end portions;

first attachment means being disposed on said wall surface for fixedly holding said first end portion on said cap;

second attachment means for fixedly holding said second end portion on said inner end portion of said filling stub;

each of said end portions including a first segment and a widened second segment having a diameter greater than said first segment;

said first and second attachment means including first and second structures, respectively;

said first and second structures being formed on said wall surface and on said inner end portion of said filling stub, respectively;

said structures defining respective holding means for receiving and firmly holding corresponding ones of the widened second segments;

each of said structures having an opening formed therein so as to communicate with said holding means;

said opening having a diameter less than said diameter of said widened second segment for accommodating the first segment; and, said second structure having a longitudinal slit facing toward said central axis and said longitudinal slit being formed in said second structure so as to extend into the opening and the holding means of said second structure thereby permitting said flexible segment to be inserted therein when attaching said second end portion to said second attachment means.

2. The closure of claim 1, said elongated flexible segment being a braided cord and said end portions being defined by plastic molded on respective ends of said cord.

3. The closure of claim 1, said elongated flexible segment being a plastic band and said end portions likewise being plastic; and, said end portions being configured so as to be stable with respect to form.

4. The closure of claim 1, said widened segment having a surface which is at least a spherical surface in part.

5. The closure of claim 1, said second structure being a tube having a tube wall defining said holding means thereof; said longitudinal slit being formed in said tube wall and said tube wall defining an inner wall surface;

and, a collar formed on said inner wall surface of said tube wall to define said opening.

6. The closure of claim 1, said first structure being a projection formed on said wall surface; said projection having two legs conjointly defining a bore for receiving said first segment of said first end portion therein; and, said legs having respective ends conjointly defining a slit communicating with said bore.

7. The closure of claim 1, said second structure being a projection formed on said filling stub; said projection having two legs defining a bore for receiving said first segment of said second end portion therein; and, said legs having receptive ends conjointly defining said longitudinal slit communicating with said bore.

8. The closure of claim 1, said first and second structures both having approximately the same configuration and said first and second end portions likewise both having approximately the same configuration.

9. The closure of claim 1, said stub and said vessel conjointly defining a single integral piece.

10. The closure of claim 9, said stub and said vessel conjointly defining a single integral piece.

11. A closure for a vessel such as a fuel tank or lubricant tank of a portable handheld work apparatus having an internal combustion engine, the tank defining an interior and the closure comprising:
a filling stub formed on said vessel as an annular wall defining an opening;
said annular wall defining a central axis and having an inner end portion facing into said interior of said tank;
a cap for closing off said opening seal tight with respect to the ambient when said cap is placed on said filling stub;
said cap and said filling stub conjointly defining engaging means for receiving and securing said cap to said filling stub when said cap is mounted thereon;
said engaging means occupying a specific region within said opening of said filling stub;
said cap having a wall surface which faces into said opening when said cap is mounted on said filling stub;
holding means for preventing said cap from being separated from the vessel after the cap has been removed from said filling stub;
said holding means including a flexible member having a first and second end portions and an elongated flexible segment disposed between and interconnecting said end portions;
first attachment means being disposed on said wall surface for fixedly holding said first end portion on said cap;
second attachment means for fixedly holding said second end portion on said inner end portion of said annular wall;
each of said end portions including a first segment and a widened second segment having a diameter greater than said first segment;
said first and second attachment means including first and second structures, respectively;
said first and second structures being formed on said wall surface and on said inner end portion of said filling stub, respectively;
said structures defining respective holding means for receiving and firmly holding corresponding ones of the widened second segments;

each of said structures having an opening formed therein so as to communicate with said holding means;
said opening of said structure having a diameter less than said diameter of said widened second segment for accommodating the first segment;
said second structure including a tube wall formed on said inner end portion so as to extend downwardly therefrom;
said tube wall having a longitudinal slit facing toward said central axis and said longitudinal slit being formed in said tube wall so as to extend into the opening of said second structure and said holding means of said second structure thereby permitting said flexible segment to be inserted therein when attaching said second end portion to said second attachment means; and,
said opening of said second structure opening within said region of said engaging means whereby said flexible segment does not extend beyond said engaging means when said cap is removed from said filling stub so as not to obstruct said opening of said filling stub.

12. A closure for a vessel such as a fuel tank or lubricant tank of a portable handheld work apparatus having an internal combustion engine, the tank defining an interior and the closure comprising:
a filling stub formed on said vessel and defining an opening;
said filling stub defining a central axis and having an inner end portion facing into said interior of said tank;
a cap for closing off said opening seal tight with respect to the ambient when said cap is placed on said filling stub;
said cap and said filling stub conjointly defining engaging means for receiving and securing said cap to said filling stub when said cap is mounted thereon;
said cap having a wall surface which faces into said opening when said cap is mounted on said filling stub;
holding means for preventing said cap from being separated from the vessel after the cap has been removed from said filling stub;
said holding means including a flexible member having first and second end portions and an elongated flexible segment disposed between said end portions;
first attachment means being disposed on said wall surface for fixedly holding said first end portion on said cap;
second attachment means for fixedly holding said second end portion on said inner end of said filling stub;
each of said end portions including a first segment and a widened second segment having a diameter greater than said first segment;
said first and second attachment means including first and second structures, respectively;
said first and second structures being formed on said wall surface and on said inner end portion of said filling stub, respectively;
said structures defining respective holding means for holding corresponding ones of the widened second segments;
each of said structures having an opening formed therein for holding the first segment of the end portion;

said opening having a diameter less than said diameter of said widened second segment for accommodating the first segment; and, the holding means of said second structure including a clip defining said opening thereof for gripping the first segment and said clip defining a slit adjacent said central axis and said slit being formed in said second structure so as to extend into the opening of said second structure thereby permitting said flexible segment to be inserted therein when attaching said second end portion to said second attachment means.

13. The closure of claim 12, said stub and said vessel conjointly defining a single integral piece.

* * * * *